US008263896B2

(12) United States Patent  (10) Patent No.: US 8,263,896 B2
Schneider  (45) Date of Patent: Sep. 11, 2012

(54) AUTOMATED DETERMINATION OF PLASMA TORCH OPERATING MODE

(75) Inventor: Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1577 days.

(21) Appl. No.: 10/905,418

(22) Filed: Jan. 3, 2005

(65) Prior Publication Data

US 2006/0151445 A1  Jul. 13, 2006

(51) Int. Cl.
*B23K 10/00* (2006.01)
*B23K 9/00* (2006.01)

(52) U.S. Cl. .......... 219/121.36; 219/121.54; 219/121.57

(58) Field of Classification Search ............ 219/121.36, 219/121.39, 121.44, 121.46, 137 R, 130.01, 219/130.1, 130.21, 121.54, 121.57, 121.48; 266/70; 228/119, 125; 83/23, 184, 78, 614

See application file for complete search history.

(56) References Cited

U.S. PATENT DOCUMENTS

| | | | | |
|---|---|---|---|---|
| 5,620,617 | A * | 4/1997 | Borowy et al. | 219/121.54 |
| 5,630,954 | A * | 5/1997 | Toth | 219/130.01 |
| 5,831,237 | A * | 11/1998 | Daniel | 219/121.54 |
| 6,133,543 | A * | 10/2000 | Borowy et al. | 219/121.57 |
| 6,566,625 | B1 * | 5/2003 | Hughes | 219/121.46 |
| 6,794,601 | B2 | 9/2004 | Norris et al. | |

* cited by examiner

*Primary Examiner* — Quang Van
(74) *Attorney, Agent, or Firm* — Fletcher Yoder, P.C.

(57) ABSTRACT

A system for automatically controlling an operating mode of a plasma torch includes a plasma torch that is connected to a power source and a controller. The controller is configured to automatically determine a desired operating mode of the plasma torch and deliver a power signal to the plasma torch based on the desired operating mode.

20 Claims, 3 Drawing Sheets

AUTOMATED DETERMINATION OF PLASMA TORCH OPERATING MODE

BACKGROUND OF THE INVENTION

The present invention relates generally to plasma cutting systems and, more particularly, to a controller for use with such systems.

Plasma cutting is a process in which an electric arc is used for cutting a workpiece. Plasma cutters typically include a power source, an air supply, and a torch. The torch, or plasma torch, is used to create and maintain the plasma arc that performs the cutting. A plasma cutting power source receives an input voltage from a transmission power receptacle or generator and provides output power to a pair of output terminals, one of which is connected to an electrode and the other of which is connected to the workpiece. An air supply is used with most plasma cutters to carry and propel the arc to the workpiece and help cool the torch.

There are multiple ways of initiating this cutting process, for example contact starting or high frequency or high voltage starting. Generally, in contact start plasma cutters, a movable or fixed electrode or consumable serves as a cathode and a fixed or movable nozzle or tip serves as an anode. In some units, the air supply is used to force a separation of the electrode and tip to create an initial or pilot arc. In others, mechanical or electromechanical means serve to separate the contacts and generate the pilot arc. In either case, once the pilot arc is established, air is forced past the pilot arc whereby it is heated and ionized to form a plasma jet that is forced out of the torch through the opening in the nozzle. The air aids in extending the arc to the workpiece forming a cutting arc and initiating the cutting process.

Other systems utilize a high frequency starter to initiate the pilot and cutting arc, and still others systems employ high voltage to initiate the pilot and cutting arc. In any of the arrangements, the spaced relationship or the range of movement of the cathodic component and the anodic component require precise design and maintenance to generate the pilot arc and maintain the cutting arc.

Regardless of which system is used to generate the pilot arc, some systems provide for multiple operating modes. One such mode is an expanded metal cutting mode. Expanded metal mode (EMM) allows an operator to perform many individual plasma cuts with a single trigger activation. Such a mode allows an operator to quickly and efficiently cut "broken metal", such as grates, mesh, screen, chain, chain-link fencing, or any metallic material separated by an air gap. During expanded metal cutting mode, the plasma torch attempts to maintain an arc in the presence of an air gap in the workpiece. To accomplish this, when a controller predicts that the cutting arc is about to collapse due to an air gap in the workpiece, the pilot arc circuit is enabled such that, as the cutting arc collapses, a pilot arc is formed. The pilot arc is maintained internally within the plasma torch to sustain an arc during the gaps in the workpiece. Once the gap in the workpiece is traversed, the cutting arc is reestablished to cut the workpiece. This process is repeated until the expanded metal cutting operation is completed and the trigger is released.

While an expanded metal cutting mode allows an operator to efficiently cut expanded metal, this mode increases wear experienced by the consumable components of the plasma torch. Although this wear is normal while in the expanded metal cutting mode, when an operator desires to perform regular solid metal cutting, operating the plasma torch in expanded metal mode exposes the components of the plasma torch to unnecessary wear. That is, in solid metal mode, the plasma torch only needs to generate a pilot arc upon actuation of the torch trigger. At the end of this process, the arc is allowed to fully collapse. Therefore, performing solid metal mode cutting while in expanded metal mode can result in excess pilot arc generation.

Expanded metal cutting can also somewhat reduce the cutting power available at the end of a cutting process. This is particularly true with systems that rely on output current error detection or systems that rely on monitoring changes in output current to predict that an imminent cutting arc collapse. Specifically, since the "error" identified by these prediction systems will be high at the end of a cut, full power may not be available to ensure a clean finish on the cut.

Nevertheless, while resulting in unnecessary wear and less accurate cuts, some operators may inadvertently operate in expanded metal mode while cutting solid metal. One attempt to resolve this problem has been to provide a physical switch on the power supply requiring an operator to mechanically switch the plasma cutting system from one mode to another. However, in dynamic work environments, operators might be required to cut several different materials in a generally consecutive manner. Such an operation would require an operator to repeatedly change the operating mode of the plasma torch. Not only would such a requirement detrimentally affect process efficiency by requiring the operator to repeatedly stop a particular cutting process, travel to the power source to effectuate the change of cutting mode, and return to the cutting process, there would be no guarantee that the operator would not forget to switch the control or would simply ignore it and continue to cut solid metal in the expanded metal mode.

It would therefore be desirable to design a plasma cutting system that automatically controls the plasma torch cutter between various modes.

BRIEF DESCRIPTION OF THE INVENTION

The present invention provides a system and method that overcomes the aforementioned drawbacks. Specifically, a controller is configured to automatically set the cutting mode of the plasma torch. The controller determines if the operation of the system should be maintained in an expanded metal mode or a non-expanded/solid metal mode based, in part, on duration of a cutting arc.

Therefore, in accordance with one aspect of the present invention, a welding-type system is disclosed having a plasma torch and a controller. The controller is configured to automatically switch operation of the plasma torch between an expanded metal mode or a non-expanded metal mode.

According to another aspect of the present invention, a plasma cutting system is disclosed. The plasma cutting system has a power source constructed to generate a plasma cutting power and a plasma torch connected to the power source. The plasma cutting system is operable in a first cutting mode and a second cutting mode and includes software means for non-mechanically changing operation of the plasma torch between the first cutting mode and the second cutting mode.

According to a further aspect of the present invention, a controller of a plasma torch system is disclosed. The controller is configured to monitor an arc duration of a plasma torch, cause the cutting arc to convert to a pilot arc if the cutting arc duration does not exceed a selected duration, and allow the cutting arc to collapse if the duration of the cutting arc is at least the selected duration.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
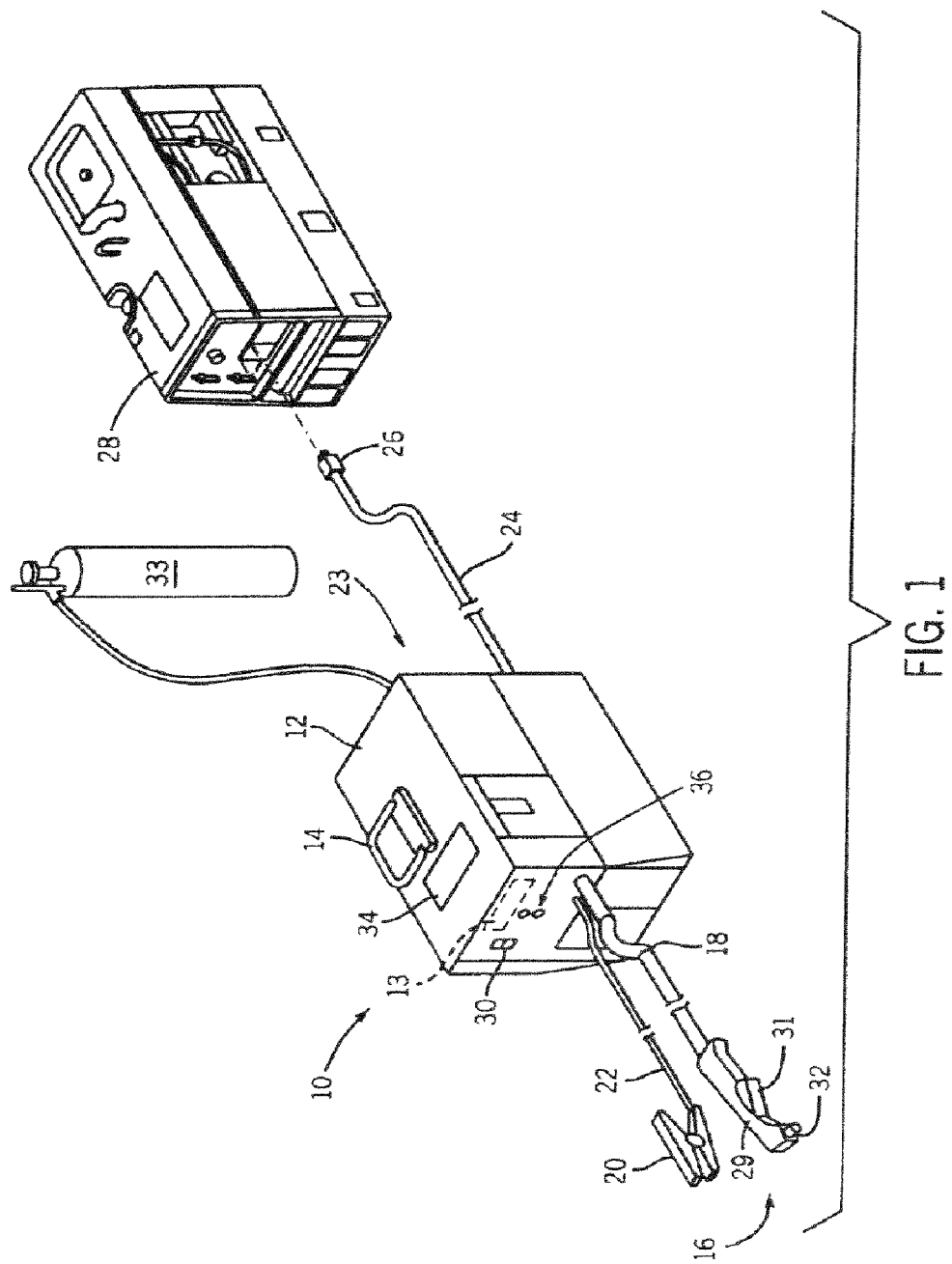
FIG. 1 is a perspective view of a plasma cutting system incorporating the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a processor 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it understood and within the scope of the claims that trigger 31 be connected to power source 12 or otherwise remotely positioned relative to torch 16.

One embodiment of the present invention includes a welding-type system 10 having a plasma torch 16 and a controller configured to automatically switch operation of the plasma torch 16 between an expanded metal mode and a non-expanded metal mode.

Also connected to power source 12 is a work clamp 20 which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Extending from a rear portion 23 of power source 12 is a power cable 24 having a plug 26 for connecting power source 12 to either a portable power supply 28 or a transmission line power receptacle (not shown). Power source 12 includes an ON/OFF switch 30 and may also include amperage and air pressure regulation controls, indicator lights, and a pressure gauge 36.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then cut the workpiece by moving torch 16 across the workpiece. The user may adjust the speed of the cut to reduce spark splatter and provide a more-penetrating cut by adjusting amperage and/or air pressure. Gas is supplied to torch 16 from a pressurized gas source 33, from an internal air compressor, or an external air compressor.

Figure 2:
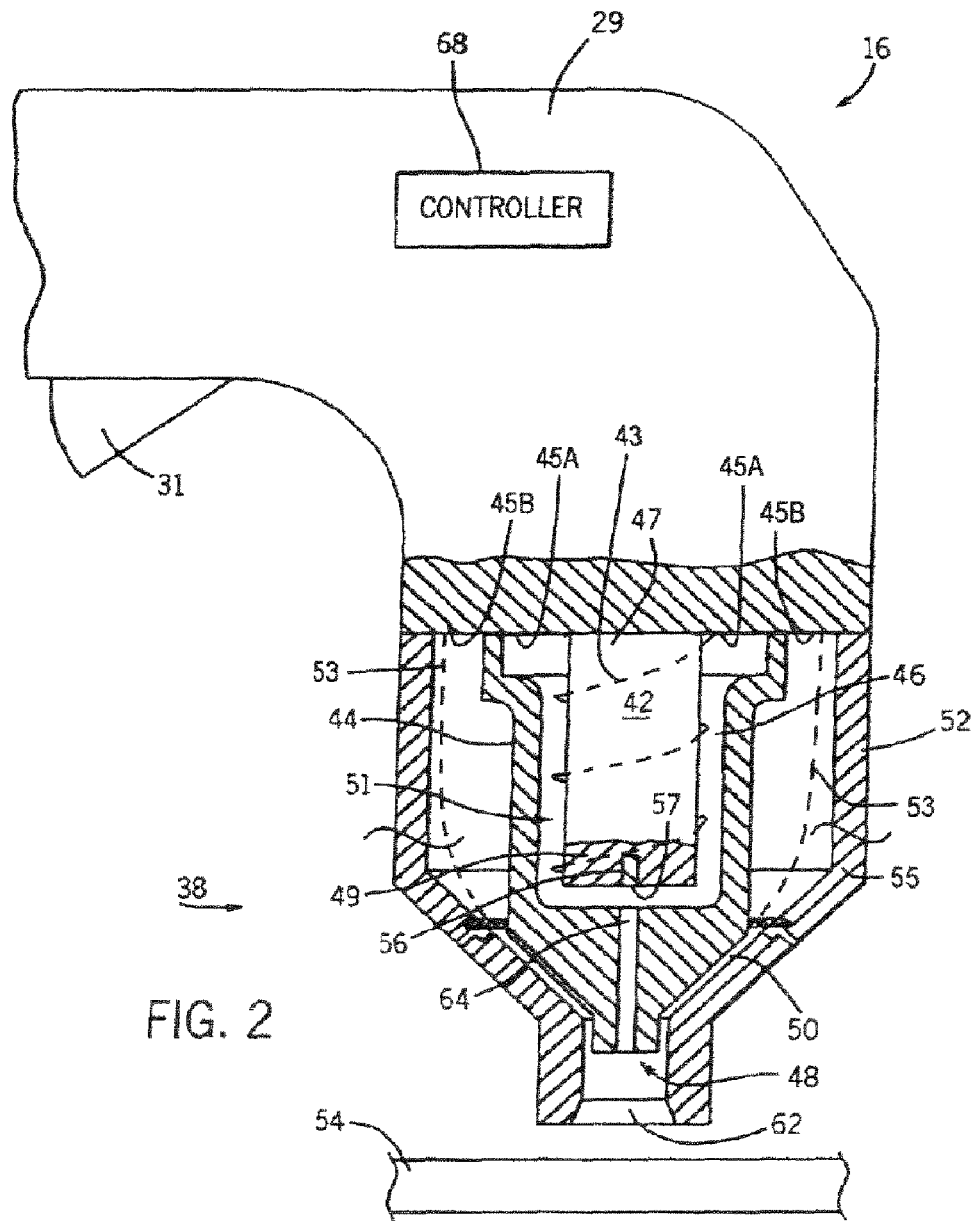
FIG. 2 is a partial cross-sectional view of the torch assembly shown in FIG. 1.

Referring now to FIG. 2, a consumable assembly 38 of plasma cutting torch 16 is shown in partial cross-section. Consumable assembly 38 is attached to handle portion 29 of torch 16 and includes a cathodic component, or electrode 42, and an anodic component, or tip 44. Electrode 42 is centrally disposed within a gas chamber 46 and has a base 47 that electronically communicates with power source 12 through handle portion 29 of torch 16. Electrode 42 includes an electrode tip 49 at an opposite end 51 from base 47 of electrode 42. A plasma forming gas 43 is passed through a swirl ring (not shown) and delivered to gas chamber 46 from a plurality of passages 45A. Gas 43 exits gas chamber 46 through an end portion 48 of tip 44. Another plurality of gas passages 45B deliver a shielding gas 53 to a shielding gas passage 50 extending between tip 44 and a cup or cap 52 and a shield 55 connected to cap 52 of consumable assembly 38.

During a cutting process, a plasma jet passes from torch 16 through end portion 48 of tip 44 and exits torch 16 through a tapered opening 62 of shield 55. A flow of shielding gas also exits torch 16 through opening 62 of shield 55 and generally encompasses the plasma jet. End portion 48 of tip 44 and opening 62 cooperate to direct the plasma flow from a plasma chamber 64 into a concentrated, highly charged, plasma flow. Plasma chamber 64 is formed in the space between electrode 42 and end portion 48 of tip 44.

A pilot arc is generally formed in plasma chamber 64 between electrode 42 and tip 44, collectively known as the contacts. The flow of gas through the torch is converted to a plasma jet initiated by the pilot arc. As shown, electrode 42 is movable relative to tip 44 such that electrode 42 is in contact with tip 44 during an idle or non-operating mode of plasma torch 16. Actuation of trigger 31 initiates a current and an air flow. The air flow separates electrode 42 and tip 44 and cooperates with the current to form the pilot arc between electrode 42 and tip 44. Gas 43 passing from gas chamber 46 directs the pilot arc through nozzle portion 48 of tip 44 and opening 62 of shield 55 toward a workpiece 54.

It is understood and within the scope of the appending claims that the torch could be constructed to form the pilot arc through contact/separation of components other than those shown. For example, the plasma torch could generate the pilot arc through contact/separation between any combination of an electrode, a tip, a nozzle, a swirl ring, or a portion of the cap. It is further understood that rather than being a "contact start" torch, the present claims are equally applicable to what are commonly referred to as high frequency and/or high voltage starting torches.

During a cutting operation, the cutting arc initiated from the pilot arc is maintained between workpiece 54 and an insert 56 of electrode 42. The cutting arc swirls about an end 57 of insert 56 and travels to workpiece 54 in the plasma flow from torch 16. Insert 56 is constructed to be conductive and to resist deterioration associated with the high temperature and power of the arc which swirls thereabout. Insert 56 exhibits certain preferred electrical, thermal, and chemical properties and is preferably formed of a hafnium or a zirconium based material.

Although insert 56 is highly conductive and is constructed to resist deterioration or wear associated with having an end of a plasma arc swirl thereabout, insert 56 is not insusceptible to wear. During a plasma cutting process, end 57 of insert 56 is subjected to current and temperature conditions that liquefy end 57 of insert 56. Although liquefied, the liquid portion of the insert remains connected to insert 56. After an arc collapses, the contacts need to re-establish contact in order to generate a subsequent arc. Suspending air flow through the torch allows the contacts to engage one another. If the contacts initiate contact too soon after arc extinguination, there are several aspects that detrimentally affect the insert wear.

As one aspect, turning off the air to allow the contacts to reinitiate contact hinders the cooling of the components of the plasma torch including the insert of the electrode thereby requiring longer for the liquefied portion of the insert to solidify. In a second aspect, the pressure change associated with turning off the air flowing through the torch may cause a portion of the liquefied material from insert 56 to be sucked or blown from insert 56. A third aspect of the detrimental affect on insert wear associated with immediate arc re-establishment is the mechanical forces associated with the contacts closing/opening. The motion of the contacts can result in a portion of insert 56 becoming dislodged or flicked from insert 56. As will be discussed further below with respect to FIG. 3, a delay is initiated prior to a subsequent arc generation after an arc collapses and while the trigger remains actuated to allow the liquefied material of the insert to solidify. Such a controlled delay reduces insert wear associated with arc generation after an arc out condition.

Plasma torch 16 includes a controller 68 configured to control an operating mode of plasma torch 16. Although shown as integrated into torch 16, it is understood that controller 68 could be connected to the cable passing between the power source and the plasma torch or preferably located in the power source. During an expanded metal operating mode, with a single actuation of trigger 31, the arc repeatedly changes between a pilot arc and a cutting arc. When torch 16 is proximate material of workpiece 54, a cutting arc is generated and when no material is proximate torch 16, torch 16 maintains a pilot arc internal to torch 16.

Figure 3:
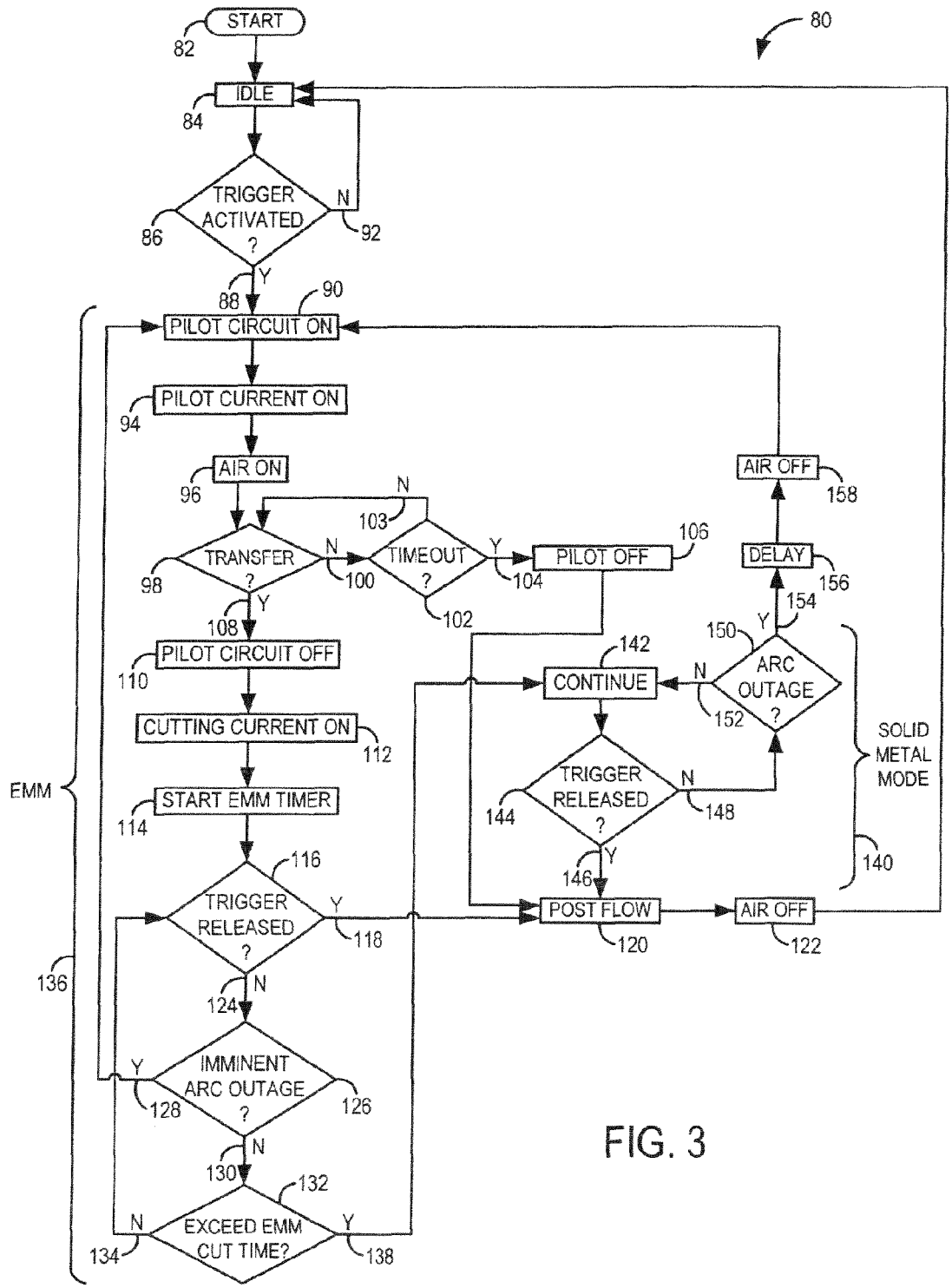
FIG. 3 shows a control technique according to which the plasma cutting system shown in FIG. 1 is operated.

FIG. 3 shows a technique 80 for operating a plasma cutting system. The technique 80 starts 82 with initialization of the plasma cutting system, such as turning on the power source. With the plasma cutting system powered up, the system enters an idle mode 84. Idle mode 84 is indicative of the plasma cutting system being ready for operation, such as being turned on, but without a trigger actuation. When a trigger 86 of the plasma torch system is activated 88, the system enables a pilot arc circuit 90 such that the plasma torch can generate and support a pilot arc. While trigger 86 remains non-actuated 92, the plasma cutting system remains in idle mode 84.

With the pilot arc circuit enabled 90, a pilot arc current is delivered to the contacts of the torch 94. Pilot arc current 94 is sufficient to maintain a pilot arc and initiate a cutting arc. That is, when the torch is positioned in close proximity to a workpiece, a portion of the current of the pilot arc current is sufficient to generate an initial cutting arc between the plasma torch and the workpiece. The system monitors the condition of the pilot arc to determine when a current is present in the workpiece lead or when there is a change in the pilot arc current indicative of an arc transfer 98 to a workpiece.

The system is configured to maintain a pilot arc without a transfer 100 for a selected duration or timeout 102. If a pilot arc is maintained without transfer 100 for a duration sufficient to trigger timeout 102, the system disables the pilot circuit, turns off the pilot current, waits for the release of the trigger and goes to a post flow 120 which is discussed further below. Timeout 102 is utilized when the trigger of the torch is activated before an operator is ready to perform a plasma cutting operation. Preferably, if an operator actuates the trigger of the torch such that a pilot arc is generated and the pilot arc is not transferred to a workpiece within 3-5 seconds, the pilot arc will be extinguished and the operator will be required to re-trigger the plasma torch in order to generate a subsequent pilot arc. Alternatively, it is contemplated that the pilot arc could be maintained until a cutting arc is established.

When a pilot arc transfer has been sensed 108, pilot arc circuit 110 enabled at step 90 is then disabled and a cutting current 112 is provided to the plasma torch. It is understood that the current required to perform a cutting process is generally greater than the pilot arc current required to transfer the arc. Understandably, the transition from the pilot arc current to the cutting current is dependant on individual users and applications and can vary accordingly. That is, a particular user or application may require a more instantaneous response than other users or applications. Accordingly, it is envisioned that the transition from a pilot arc current to a cutting arc current be any of nearly instantaneous or a gradual increase or ramped response.

Once cutting current 112 has been supplied, the system initiates an expanded metal mode (EMM) timer 114. With timer 114 running, the system monitors a trigger condition 116 of the plasma torch. If the trigger is released 118 after timer 114 has been started, process 80 maintains the flow of air through the torch at post flow 120. Post flow 120 maintains the flow of gas through the torch and can allow a subsequent triggered re-start of the plasma torch before the post flow has been completed. Preferably, post flow 120 allows air to flow through the torch for 5-20 seconds after the trigger has been released. Maintaining air flow through the torch allows the torch to cool down quickly after a cutting operation. Upon completion of post flow 120, the air flow is turned off 122 thereby allowing the contacts to re-engage one another and returning the plasma torch to idle mode 84 for subsequent plasma cutting processes. These subsequent plasma cutting processes require trigger activation 88 to establish an arc.

If the trigger is not released 124, the cutting arc is monitored for an imminent arc outage 126. The imminent arc outage 126 can be determined from a change in the current of the cutting arc, resistance experienced by the cutting arc power signal, or other plasma torch operating parameters. If an imminent collapse of the cutting arc is detected 128, pilot arc circuit is enabled 90 to allow the cutting arc to convert to a pilot arc state. By enabling the pilot arc circuit 90 prior to cutting arc collapse or outage 128, complete loss, collapse, or extinguination of the arc is averted by converting the cutting arc to the pilot arc. If an imminent arc outage is not detected 130, the system checks if timer 114 has exceeded a desired expanded metal cutting time 132. If timer 114 has not exceeded the desired expanded metal cutting time 134, the system returns to monitor the trigger position 116. Preferably, the desired EMM cutting time is approximately three seconds. That is, if a cutting arc is not maintained for at least three seconds, the system allows the cutting arc to convert to a pilot arc without reactivation of the trigger of the plasma torch. The three seconds for EMM cutting time is merely exemplary and it is understood that other durations may be desirable. Expanded metal mode 136 allows repeated conversion of an arc between a pilot arc state and a cutting arc state during a single trigger actuation 88 until a cutting arc is maintained longer than the expanded metal cutting time 138.

Alternative to automatically switching from expanded metal mode to normal cutting mode after a selected duration, the control of the mode of operation of the plasma cutting system could be controlled automatically based on a user's desired output. Because expanded metal is generally lighter gauge material which requires a lower cutting current than more substantial material, by monitoring an operator's selection of a desired output power, the controller could control the operating mode of the plasma cutting system based on a user's desired output.

After a cutting arc has been maintained longer than the desired expanded metal mode time 138 or, alternatively, if the output strays beyond a tolerance from the desired output power, the system exits expanded metal mode 136 and enters a non-expanded, or solid metal mode 140. During solid metal mode 140, the cutting arc is maintained 142 until the cut is complete, the torch is removed from the workpiece, or the trigger is released. The system monitors the trigger condition 144 and when the trigger is released 146, the process disables plasma cutting current and enters post flow 120. As previously discussed, post flow 120 continues the flow of air through the torch after the arc has collapsed and thereby cools the internal components of the torch. If the trigger is not released 148, and an arc outage has not been detected, 150, 152, the cutting arc is maintained 142 until the trigger is released 144, 146 or an arc collapse is detected 150, 154.

If the arc has collapsed 154 but the trigger has not been released 148, a controlled delay is initiated 156. During controlled delay 156, the arc current is disabled but an air flow through the torch is maintained for a selected period. Preferably, the duration of delay 156 is approximately half a second. Understandably other durations could be utilized and are contemplated. Maintaining the air flow through the plasma torch for the duration of delay 156 maintains separation of the contacts of the plasma torch. The delay in closing the contacts, in conjunction with the air flow through the torch, allows that portion of the insert liquefied during a cutting operation to solidify prior to the contacts closing. Such a construction reduces the wear experienced by the insert of the consumable electrode when the trigger has not been released after an arc collapses.

After delay 156, the air 158 through the plasma torch is turned off thereby allowing the contracts to close or return to an engaged orientation. With the trigger still depressed 154, delay 156 satisfied, and the air turned off 158, the system re-enables pilot arc circuit 90 thereby allowing the plasma torch to generate a subsequent arc.

The above-described technique 80 allows the generation of a subsequent arc after an initial arc has collapsed without trigger reactivation. Additionally, a plasma cutting system according to the present invention automatically switches operation of the plasma cutting system between an expanded metal operating mode, which allows an arc to repeatedly convert between an expanded metal mode, which switches between a pilot arc condition and a cutting arc condition, and a non-expanded or solid metal operating mode, which allows arc extinguishment, whereby no pilot or cutting arc is present, and arc establishment with a single trigger activation. Such a process automatically and non-mechanically switches the plasma cutting system between operating modes.

Additionally, when the trigger remains engaged after an arc has extinguished, indicating an operators desire to perform subsequent cutting operations, the process reduces the wear experienced by the insert of the consumable assembly by delaying reengagement of the contacts of the plasma torch. Such a configuration allows any liquefied portion of the insert to solidify prior to subsequent arc generation thereby reducing insert wear associated with movement of the contacts and subsequent arc generation.

Therefore, one embodiment of the present invention includes a welding-type system having a plasma torch and a controller configured to automatically switch operation of the plasma torch between an expanded metal mode and a non-expanded metal mode.

Another embodiment of the present invention includes a plasma cutting system having a power source constructed to generate a plasma cutting power and a plasma torch connected to the power source. The plasma cutting system is operable in a first cutting mode and a second cutting mode and includes software means for non-mechanically changing operation of the plasma torch between the first cutting mode and the second cutting mode.

A further embodiment of the present invention includes a controller of a plasma torch system configured to monitor an arc duration of a plasma torch, cause the cutting arc to convert to a pilot arc if the cutting arc duration does not exceed a selected duration, and allow the cutting arc to collapse if the duration of the cutting arc is at least the selected duration.

As one skilled in the art will fully appreciate, the heretofore description of a plasma cutting system is one example of a plasma cutting system according to the present invention. It is understood that torches having arc starting techniques other than that shown are envisioned and within the scope of the claims.

The present invention has been described in terms of the preferred embodiment, and it is recognized that equivalents, alternatives, and modifications, aside from those expressly stated, are possible and within the scope of the appending claims.

What is claimed is:

1. A welding-type system comprising:
a plasma torch configured to generate a cutting arc upon a supply of cutting current thereto; and
a controller configured to:
automatically switch operation of the plasma torch between an expanded metal mode and a non-expanded metal mode upon generation of the cutting arc; and
operate the plasma torch in the non-expanded metal mode for a duration of a torch trigger actuation if the cutting arc is present over a pre-defined time period after generation of the cutting arc.

2. The welding-type system of claim 1 further comprising a power source constructed to generate a power signal suitable for plasma cutting and connected to the plasma torch.

3. The welding-type system of claim 2 wherein the controller is positioned in at least one of the plasma torch and the power source.

4. The welding-type system of claim 1 wherein the expanded metal mode is further defined by the plasma torch maintaining at least one of a cutting arc and a pilot arc for a duration a trigger is depressed.

5. The welding-type system of claim 4 wherein the controller comprises a pilot arc circuit to generate the pilot arc when enabled and wherein the controller is further configured to disable the pilot arc circuit if the cutting arc is present for the pre-defined time period after generation of the cutting arc.

6. The welding-type system of claim 1 wherein the non-expanded metal mode is further defined by arc extinguishing after a cutting arc terminates.

7. The welding-type system of claim 6 wherein the controller is further configured to delay generation of a subsequent arc for a predetermined interval after an initial arc extinguishes.

8. The welding-type system of claim 1 wherein the controller is further configured to:
initiate a timer upon the supply of the cutting current to the plasma torch;
monitor a current level of the cutting current to detect a pending cutting arc outage; and if a pending cutting arc outage is detected within the pre-defined time period measured by the timer, then automatically switch operation of the plasma torch between the expanded metal mode and the non-expanded metal mode;

otherwise, if no pending cutting arc outage is detected within the pre-defined time period measured by the timer, then operate the plasma torch in the non-expanded metal mode.

9. The welding-type system of claim 1 wherein the pre-defined time limit after generation of the cutting arc is approximately 3 seconds.

10. The welding-type system of claim 1 wherein the controller operates the plasma torch in the non-expanded metal mode for the duration of the torch trigger actuation if the cutting arc is continuously present for the pre-defined time period after generation of the cutting arc and the trigger remains actuated.

11. A plasma cutting system comprising:
a power source constructed to generate a plasma cutting power;
a plasma torch connected to the power source and operable in a first cutting mode and a second cutting mode and configured to generate a cutting arc; and
software means for non-mechanically changing operation of the plasma torch between the first cutting mode and the second cutting mode and for operating the plasma torch in the second cutting mode for a remainder of a torch trigger depression if a maintaining of the cutting arc exceeds a pre-determined temporal threshold.

12. The plasma cutting system of claim 11 wherein the first cutting mode is further defined by maintaining a pilot arc after completing a cutting arc and the second cutting mode is further defined by collapsing an arc after completion of a cutting process.

13. The plasma cutting system of claim 11 wherein the software means is attached to at least one of the plasma torch and the power source.

14. The plasma cutting system of claim 11 further comprising an electrode and a contactor wherein providing separation between the electrode and the contactor generates an electrical arc.

15. The plasma cutting system of claim 14 wherein the software means is further configured to maintain separation of the electrode and the contactor for a duration after the arc collapses.

16. The plasma cutting system of claim 11 further comprising a gas source constructed to provide gas to the plasma torch, the software means configured to allow gas to pass from the plasma torch after an arc collapses.

17. The plasma cutting system of claim 11 wherein the software means is configured for non-mechanically changing operation of the plasma torch between the first cutting mode and the second cutting mode for every actuation of a trigger of the plasma torch.

18. A plasma cutting system comprising:
a plasma torch; and
a controller configured to:
monitor a cutting arc duration of the plasma torch;
cause the cutting arc to convert to a pilot arc if the cutting arc duration does not exceed a selected duration; and
allow the cutting arc to collapse if the duration of the cutting arc is at least the selected duration.

19. The plasma cutting system of claim 18 wherein the controller is further configured to repeatedly cause the cutting arc to convert to a pilot arc if the cutting arc duration does not exceed a selected duration and allow the cutting arc to collapse if the duration of the cutting arc is at least the selected duration for at least one of every trigger actuation and the duration of a trigger actuation.

20. The plasma cutting system of claim 18 wherein the controller is configured to cause the cutting arc to convert to a pilot arc when operating in an expanded metal mode and allow the cutting arc to collapse in a non-expanded metal mode.

* * * * *